(12) United States Patent
Kim

(10) Patent No.: US 10,423,246 B2
(45) Date of Patent: Sep. 24, 2019

(54) INPUT DEVICE AND ELECTRONIC APPARATUS FOR RECEIVING SIGNAL FROM THE INPUT DEVICE

(71) Applicant: Samsung Electronics Co., Ltd., Suwon-si, Gyeonggi-do (KR)

(72) Inventor: Kang-nam Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/188,334

(22) Filed: Jun. 21, 2016

(65) Prior Publication Data

US 2016/0378211 A1 Dec. 29, 2016

Related U.S. Application Data

(60) Provisional application No. 62/185,040, filed on Jun. 26, 2015.

(30) Foreign Application Priority Data

Jan. 20, 2016 (KR) .......................... 10-2016-0007232

(51) Int. Cl.
*G06F 3/0354* (2013.01)
*G06F 3/038* (2013.01)
(Continued)

(52) U.S. Cl.
CPC .......... *G06F 3/03545* (2013.01); *G06F 3/038* (2013.01); *G06F 3/0416* (2013.01); *G06F 3/044* (2013.01)

(58) Field of Classification Search
CPC .... G06F 3/03545; G06F 3/038; G06F 3/0416; G06F 3/044
See application file for complete search history.

(56) References Cited

U.S. PATENT DOCUMENTS 5,206,785 A * 4/1993 Hukashima .......... G01D 5/2417
361/283.2
6,727,439 B2 4/2004 Chao et al.
(Continued)

FOREIGN PATENT DOCUMENTS

EP 2 221 709 A2 8/2010
EP 2 365 424 A2 9/2011
(Continued)

OTHER PUBLICATIONS

European Office Action in corresponding Application No. 16814648.8 dated May 17, 2019.

*Primary Examiner* — Sahlu Okebato
(74) *Attorney, Agent, or Firm* — Jefferson IP Law, LLP

(57) ABSTRACT

An input device and an electronic apparatus for receiving a signal from the input device are provided. The input device includes a conductive tip configured to receive an electric field transmission signal generated from at least one electrode of the electronic apparatus, a circuit configured to generate an electric field response signal corresponding to the electric field transmission signal, a variable capacitor disposed between the conductive tip and the circuit and configured to vary the electric field response signal according to writing pressure applied to the conductive tip, and a case in which the circuit and the variable capacitor are disposed. The variable capacitor includes a first electrode and a second electrode coupled to the circuit, a conductive variable electrode disposed to face the first electrode, and a dielectric disposed between the first electrode and the conductive variable electrode. The first electrode and the second electrode are fixed to the case.

18 Claims, 20 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 2009/0114459 A1* | 5/2009 | Fukushima | G06F 3/03545 |
| | | | 178/19.03 |
| 2011/0241703 A1* | 10/2011 | Fukushima | H01G 5/16 |
| | | | 324/662 |
| 2013/0120052 A1* | 5/2013 | Siska | H03K 17/962 |
| | | | 327/517 |
| 2013/0300708 A1 | 11/2013 | Kim | |
| 2013/0314382 A1 | 11/2013 | Fukushima et al. | |
| 2014/0104224 A1 | 4/2014 | Ih et al. | |
| 2014/0240298 A1 | 8/2014 | Stern | |
| 2015/0070330 A1 | 3/2015 | Stern | |
| 2015/0160782 A1 | 6/2015 | Park et al. | |

FOREIGN PATENT DOCUMENTS

| EP | 2 672 494 A2 | 12/2013 |
|---|---|---|
| WO | 2 790 085 A2 | 10/2014 |

* cited by examiner

INPUT DEVICE AND ELECTRONIC APPARATUS FOR RECEIVING SIGNAL FROM THE INPUT DEVICE

CROSS-REFERENCE TO RELATED APPLICATION(S)

This application claims the benefit under 35 U.S.C. § 119(e) of a U.S. Provisional application filed on Jun. 26, 2015 in the U. S. Patent and Trademark office and assigned Ser. No. 62/185,040, and under 35 U.S.C. § 119(a) of a Korean patent application filed on Jan. 20, 2016 in the Korean Intellectual Property Office and assigned Serial number 10-2016-0007232, the entire disclosure of each of which is hereby incorporated by reference.

TECHNICAL FIELD

The present disclosure relates to an input device and an electronic apparatus for receiving a signal from the input device. More particularly, the present disclosure relates to an input device capable of improving durability of a first electrode and a second electrode in a variable capacitor and an electronic apparatus for receiving a signal from the input device.

BACKGROUND

In recent years, smart phones or tablet personal computers (PCs) have actively propagated, and the technology for electronic apparatuses mounted with a contact position measuring device has been actively developed. The smart phones or the tablet PCs may typically include touch screens, and the user may designate a specific position of the touch screen using a stylus pen. A specific signal may be input to a smart phone by designating the specific position of the touch screen by the user.

The current touch screens may perform various functions according to a position of the stylus pen and writing pressure in the position of the stylus pen by detecting the position and writing pressure of the stylus pen. To detect the writing pressure of the stylus pen, a variable capacitor of which capacitance is varied according to the writing pressure of the stylus pen may be provided in the stylus pen.

The capacitance of the variable capacitor may be varied according to a distance between two electrodes or an area between two electrodes. The variable capacitor of which the capacitance is changed by the variation in the area between two electrodes may be typically employed in the stylus pen.

It is difficult to couple an electrode disposed close to a front end of the stylus pen employing the variable capacitor to a resonance circuit in that two electrodes of the capacitor have to be arranged in a longitudinal direction of the stylus pen and the resonance circuit is arranged in a rear end of the stylus pen.

There is a need for a technology for coupling both of two electrodes to the resonance circuit without a change in a diameter of the stylus pen in that the current stylus pen has to be implemented to have a diameter as small as possible.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

An aspect of the present disclosure is to provide an input device capable of improving durability of a first electrode and a second electrode in a variable capacitor and an electronic apparatus for receiving a signal from the input device.

In accordance with an aspect of a present disclosure, an input device which inputs a position to an electronic apparatus which receives a touch signal is provided. The input device includes a conductive tip configured to receive a transmission signal generated from at least one electrode of the electronic apparatus, a circuit configured to generate a response signal corresponding to the transmission signal, a variable capacitor disposed between the conductive tip and the circuit and configured to vary the response signal according to writing pressure applied to the conductive tip, and a case in which the circuit and the variable capacitor are disposed. The variable capacitor may include a first electrode and a second electrode coupled to the circuit, a conductive variable electrode disposed to face the first electrode, and a dielectric disposed between the first electrode and the conductive variable electrode. The first electrode and the second electrode may be fixed to the case.

In accordance with another aspect of the present disclosure, an input device which inputs a position to an electronic apparatus which receives a touch signal is provided. The input device includes a conductive tip, a conductive variable electrode of which a shape is deformed according to applied pressure of the conductive tip, a first electrode disposed in a position in which a contact area with the conductive variable electrode or a distance to the conductive variable electrode is varied according to deformation of the conductive variable electrode, a dielectric disposed between the first electrode and the conductive variable electrode, and a second electrode electrically coupled to the conductive variable electrode. Positions of the first electrode and second electrode may be fixed.

In accordance with another aspect of the present disclosure, an electronic apparatus is provided. The electronic apparatus includes a touch panel configured to measure an input position of an input device. The touch panel may include at least one electrode, and a controller configured to control an electric field transmission signal generated from the at least one electrode to be transmitted to the input device and to control a response signal of the input device with respect to the electric field transmission signal to be received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
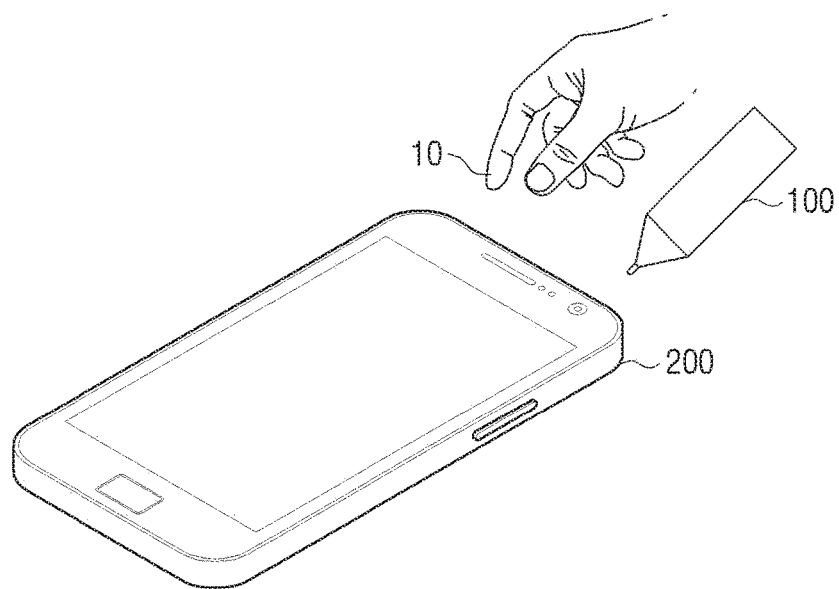
FIG. 1 is a schematic perspective view illustrating an input device and an electronic apparatus which receives a signal from the input device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein in reference to elements of the present disclosure regardless of an order and/or importance, such elements should not be construed as limited by these terms. The terms are used only to distinguish one element from other elements. For example, a first user apparatus and a second user apparatus may refer to different user apparatuses regardless of an order or importance. For example, without departing from the spirit of the inventive concept, a first element may refer to a second element, and similarly, the second element may refer to the first element.

It will be understood that when an element (for example, a first element) is referred to as being "(operatively or communicatively) coupled with/to" or "connected to" another element (for example, a second element), it can be directly connected or coupled to the other element or intervening elements (For example, third elements) may be present. In contrast, when an element is referred to as being "directly connected to" or "directly coupled to" another element, there are no intervening elements or layers present.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. In various embodiments of the present disclosure, the articles "a," "an," and "the" are singular in that they have a single referent; however, the use of the singular form in the present document should not preclude the presence of more than one referent. In other words, elements of the present disclosure referred to in the singular may number one or more, unless the context clearly indicates otherwise. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an input device and an electronic apparatus which receives a signal from the input device according to various embodiments will be described in detail with reference to the accompanying drawings.

FIG. 1 is a schematic perspective view illustrating an input device and an electronic apparatus which receives a signal from the input device according to an embodiment of the present disclosure.

Referring to FIG. 1, an electronic apparatus 200 and an input device 100 may be illustrated.

The electronic apparatus 200 may determine a touch or a proximity position of the input device 100. For example, the electronic apparatus 200 may include a plurality of electrodes, and may transmit a transmission signal (that is, a driving signal) to a resonance circuit of an object (that is, the input device 100) approaching the electronic apparatus 200 through electrostatic capacitive coupling by applying the transmission signal to at least one electrode.

The electronic apparatus 200 may determine a position of the input device 100 by receiving a response signal generated in the resonance circuit of the input device 100 from at least one electrode. Detailed configuration and operation of the electronic apparatus 200 will be described later with reference to FIG. 19. For example, the electronic apparatus 200 may be a tablet, a digitizer, a touch pad, a touch screen, and the like. In another example, the electronic apparatus 200 may be a laptop computer, a portable phone, a smart phone, a portable multimedia player (PMP), a Moving Picture Experts Group phase 1 or phase 2 (MPEG-1 or MPEG-2) audio layer 3 (MP3) player, an electronic bulletin board, and the like including the tablet, the digitizer, the touch pad, the touch screen, and the like.

The input device 100 may form capacitance with at least one among the plurality of electrodes in the electronic apparatus 200 and may receive energy for resonance (that is, electric field transmission signal) through the formed capacitance.

The input device 100 may transmit the response signal generated in the resonance circuit to the at least one electrode in the electronic apparatus 200. The input device 100 may be implemented in a stylus pen form, but this is not limited thereto. Detailed configuration and operation of the input device 100 will be described later with reference to FIGS. 2 to 7, 8A, 8B, and 9 to 12.

As described above, the electronic apparatus 200 according to an embodiment may provide the electric filed transmission signal to the input device 100 through electrostatic capacitance coupling, and thus the input device 100 may operate without self-power.

It has been described in FIG. 1 that the input device 100 operates only in a passive manner, but the input device 100 may operate in an active manner with the self-power.

It has been described in FIG. 1 that the electronic apparatus 200 determines only the position of the input device 100 including the resonance circuit, but the electronic apparatus 200 may determine a position of a finger 10 of the user by detecting change in capacitance of the electrode according to the position of the finger 10 of the user or change in a signal magnitude due to the capacitance change. However, the operation of determining the position of the finger in the electronic apparatus 200 including a plurality of electrodes is the widely known technology, and thus only the technology for detecting the position of the input device 100 will be described in detail herein.

FIG. 1 has illustrated that one input device 100 is coupled to the electronic apparatus 200, but the electronic apparatus 200 may be implemented in such a manner that a plurality of input devices are coupled to one electronic apparatus 200 and positions of the plurality of input devices may be detected through the electronic apparatus 200.

Figure 2:
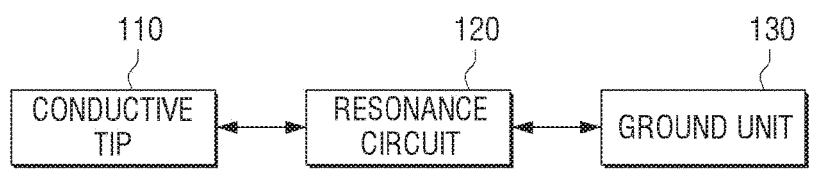
FIG. 2 is a schematic block diagram illustrating a configuration of the input device illustrated in FIG. 1 according to an embodiment of the present disclosure.

FIG. 2 is a schematic block diagram illustrating a configuration of the input device illustrated in FIG. 1 according to an embodiment of the present disclosure.

Referring to FIG. 2, the input device 100 may be configured of a conductive tip 110, a resonance circuit 120, and a ground unit 130. The input device 100 may be implemented, for example, in a pen form.

The conductive tip 110 may form electrostatic capacitive coupling with at least one among a plurality of electrodes in the electronic apparatus 200. The conductive tip 110 may be formed of, for example, a metallic tip. The conductive tip 110 may be located in the inside of a nonconductive material or a portion of the conductive tip 110 may be exposed to the outside. To smooth the writing sense in using of the input device 100, the input device 100 may further include an insulating member (see 111 of FIG. 5) which prevents the conductive tip 110 from being in contact with the electronic apparatus 200.

Referring to FIG. 2, the resonance circuit 120 (or circuit unit) may include a parallel resonance circuit configured of an inductor 120b coupled to the conductive tip 110 and a capacitor 120c and a variable capacitor 120a.

The resonant circuit 120 may receive energy for resonance (that is, electric field transmission signal) through capacitive coupling between at least one electrode in the electronic apparatus 200 and the conductive tip. For example, the resonance circuit 120 may be resonant with the electric field transmission signal input from the electronic apparatus 200. The resonance circuit 120 may output an electric field response signal due to the resonance even after the input of the electric field transmission signal is terminated. In this example, the resonance circuit 120 may output a sine wave signal having a resonance frequency of the resonance circuit.

The capacitance of the variable capacitor in the resonance circuit 120 may be varied according to contact pressure of the conductive tip and the resonance frequency may be varied. This operation will be described below with reference to FIG. 3.

Figure 3:
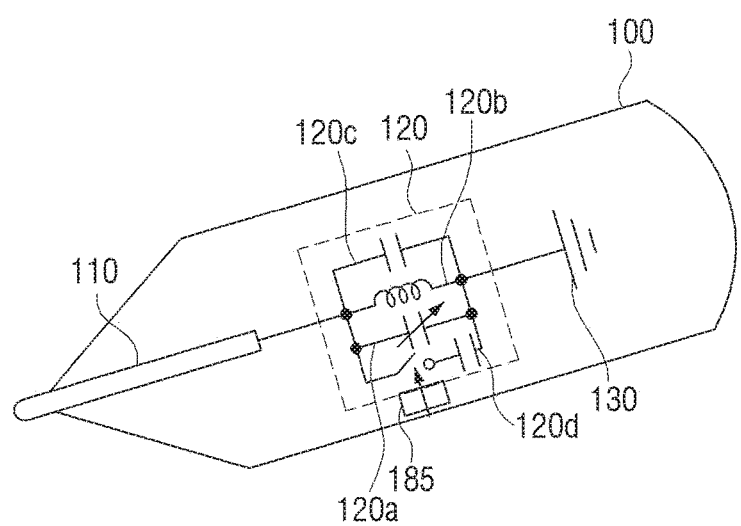
FIG. 3 is a schematic diagram illustrating an circuit example of the input device illustrated in FIG. 1 according to an embodiment of the present disclosure.

FIG. 3 is a diagram illustrating a circuit of the input device illustrated in FIG. 1 according to an embodiment of the present disclosure.

Referring to FIG. 3, the resonance circuit 120 may be configured of the variable capacitor 120a, the inductor 120b, a first capacitor 120c, and a second capacitor 120d. One terminal of the resonance circuit 120 may be coupled to the conductive tip 110 and the other terminal of the resonance circuit 120 may be grounded.

The inductor 120b and the first capacitor 120c may be coupled in parallel to operate as the resonance circuit. The resonance circuit may have a high impedance characteristic in a specific resonance frequency.

Figure 5:
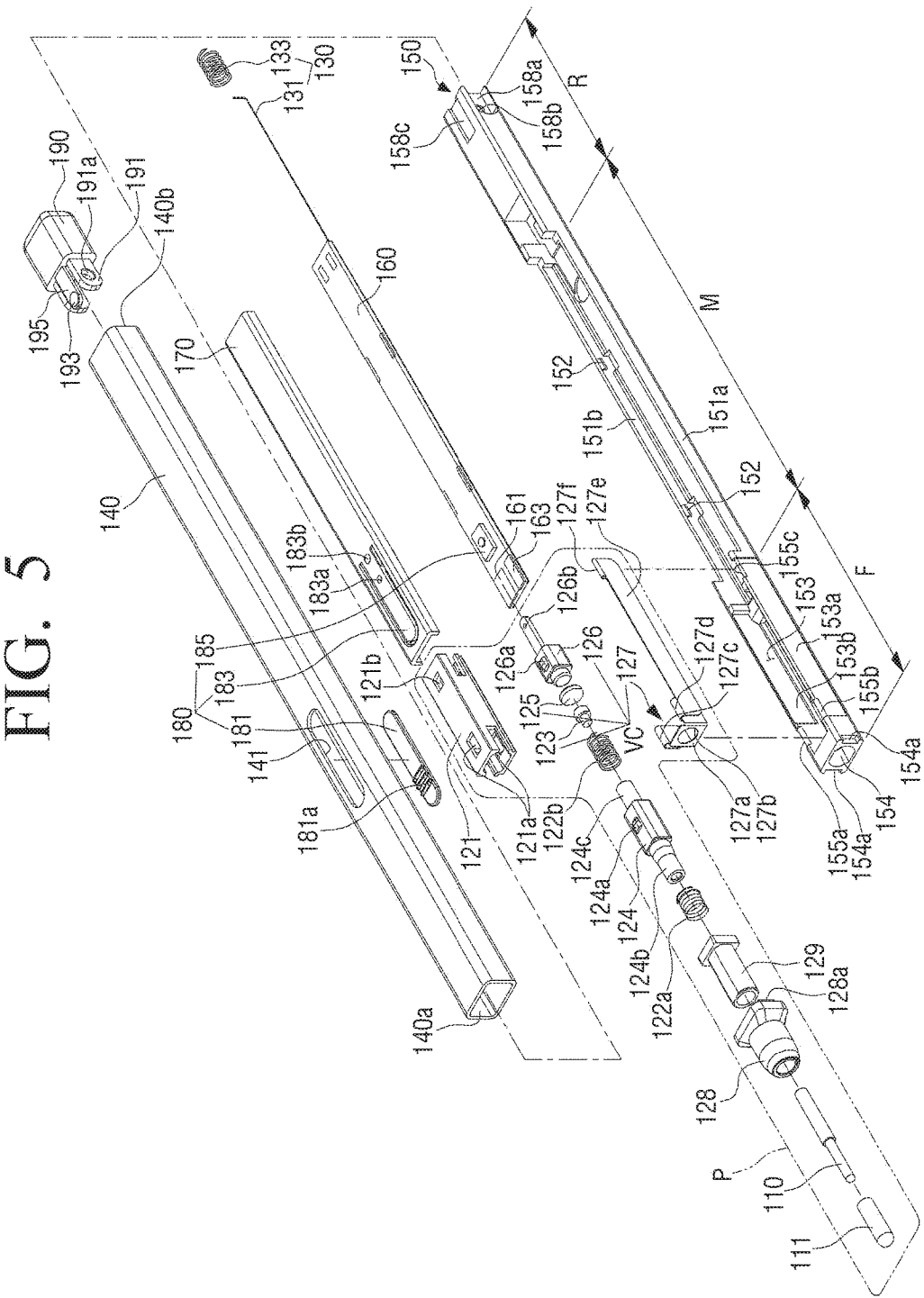
FIG. 5 is an exploded perspective view illustrating the input device illustrated in FIG. 1 according to an embodiment of the present disclosure.

The variable capacitor 120a may be coupled to the resonance circuit in parallel and the capacitance of the variable capacitor 120a may be varied according to the change in the contact pressure of the conductive tip (see 110 of FIG. 5). In response to the capacitance of the variable capacitor 120a being changed, the capacitance of the resonance circuit 120 may be varied and the resonance frequency of the resonance circuit 120 may be varied. That is, the variable capacitor 120a may vary the electric field response signal according to the writing pressure applied to the conductive tip 110. Detailed form and operation of the variable capacitor 120a will be described later with reference to FIGS. 5 to 7, 8A, 8B, and 9 to 12.

The response signal provided to the electronic apparatus 200 according to an embodiment may be varied according to the contact pressure with the electronic apparatus 200, and the electronic apparatus 200 may detect the position of the input device 100 and the writing pressure of the input device 100 based on the response signal of the input device 100.

It has been described that the resonance frequency is varied using the variable capacitor 120*a*, but the resonance circuit 120 may be implemented to perform the same function using a variable inductor of which inductance is varied according to the contact pressure of the conductive tip 110.

Hereinafter, the configuration of the input device 100 according to an embodiment will be described in detail with reference to FIGS. 4 to 7, 8A, 8B, and 9 to 12.

Figure 4:
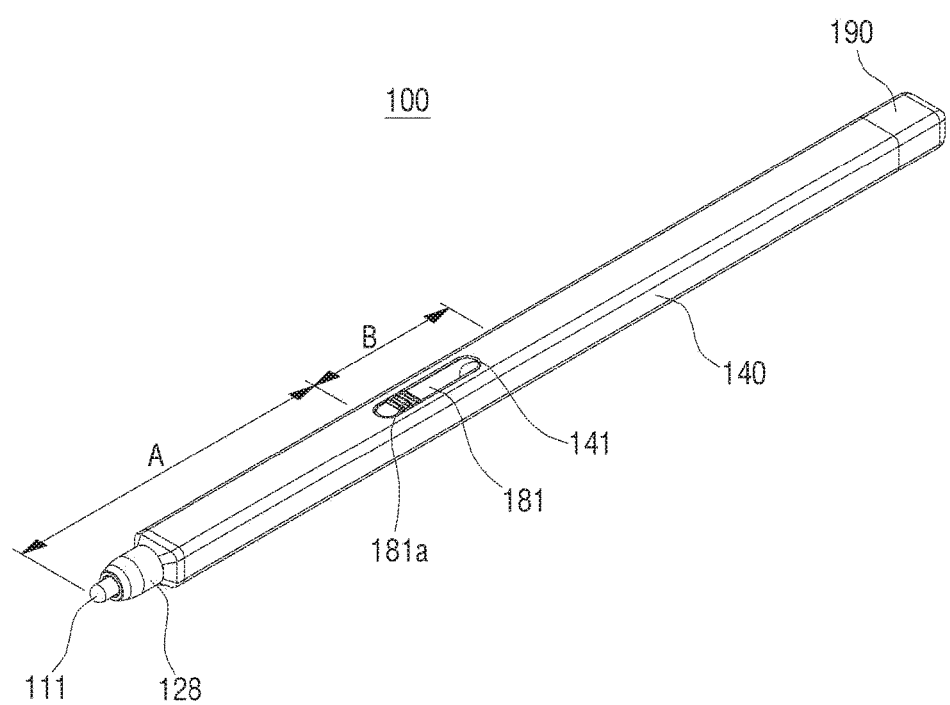
FIG. 4 is a combined perspective view illustrating the input device illustrated in FIG. 1 according to an embodiment of the present disclosure.
Figure 6:
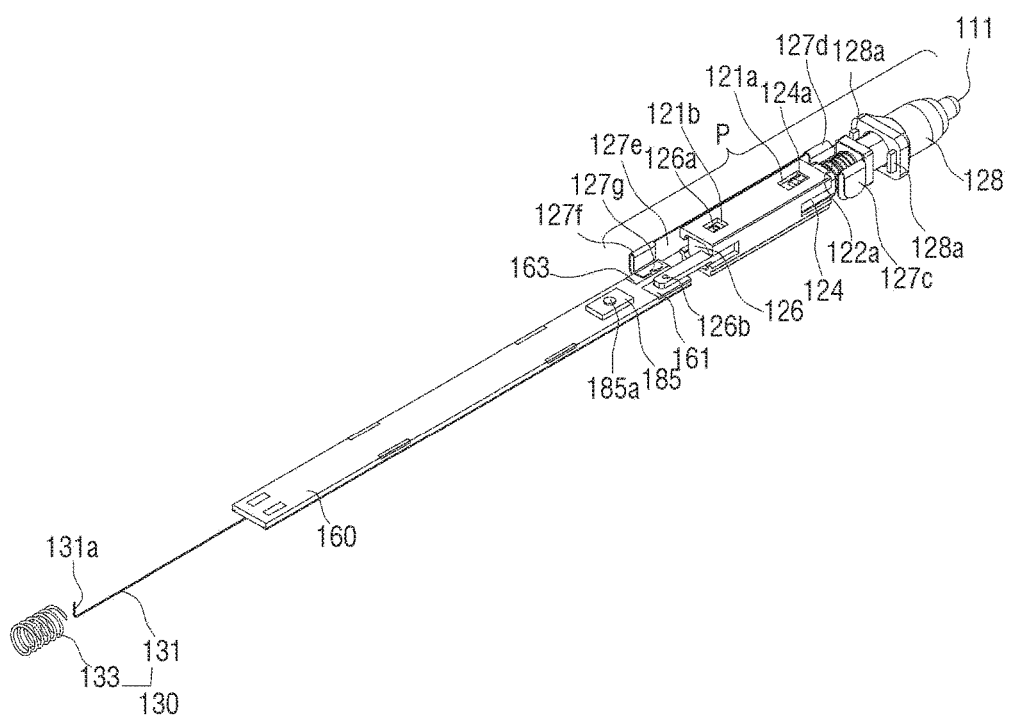
FIG. 6 is a schematic perspective view illustrating a printed circuit board (PCB) and a writing pressure module coupled thereto in the input device illustrated in FIG. 1 according to an embodiment of the present disclosure.
Figure 7:
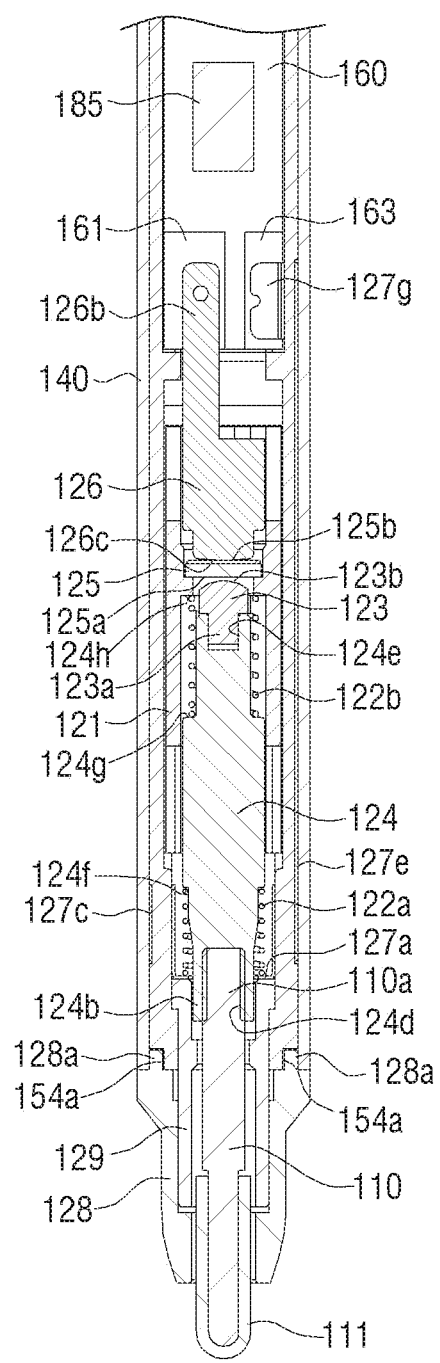
FIG. 7 is a cross-sectional diagram illustrating a section "A" illustrated in FIG. 4 according to an embodiment of the present disclosure.
Figure 8A:
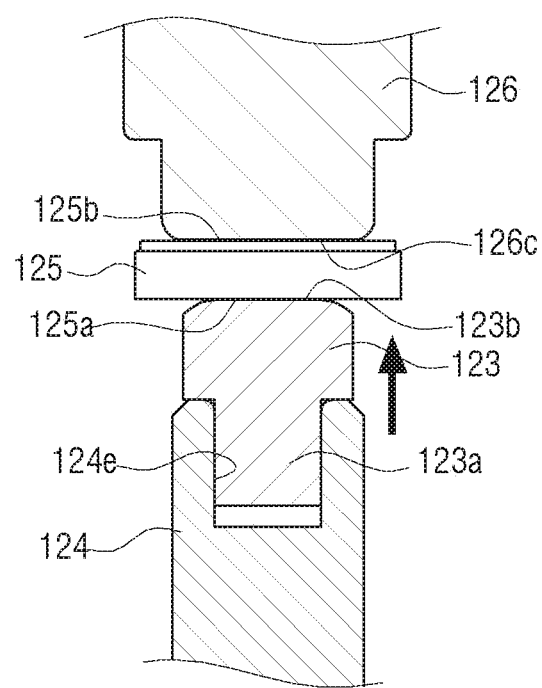
FIG. 8A is a schematic cross-sectional diagram illustrating a state that a shape of a variable electrode is deformed as the variable electrode is in tight contact with a dielectric with preset pressure according to an embodiment of the present disclosure.
Figure 8B:
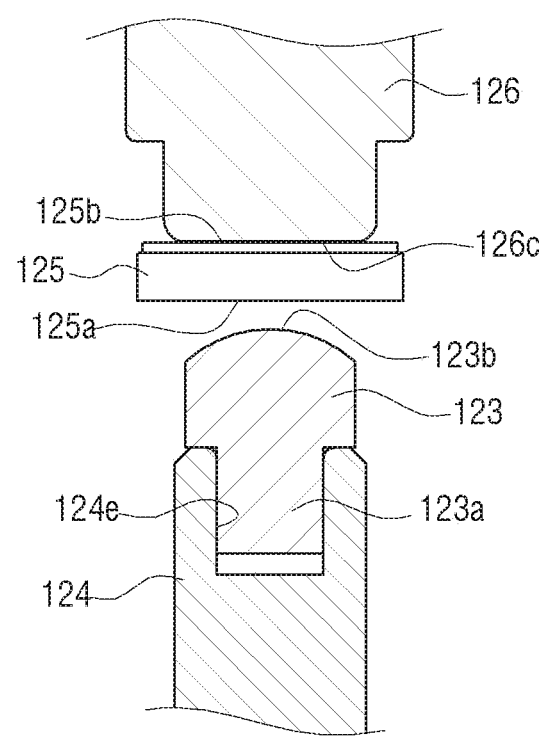
FIG. 8B is a schematic cross-sectional diagram illustrating a state that a variable electrode is spaced from a dielectric in releasing of pressure applied to a conductive tip according to an embodiment of the present disclosure.
Figure 9:
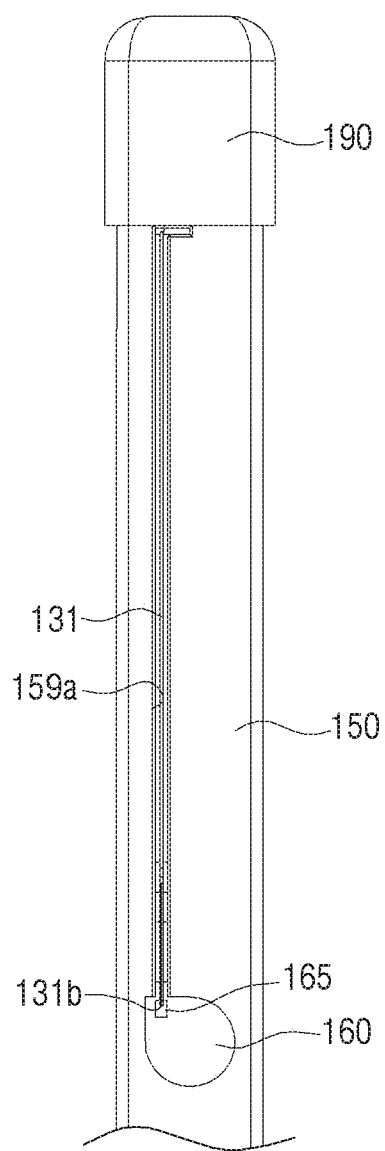
FIGS. 9, 10, and 11 are diagrams illustrating a ground structure of the input device illustrated in FIG. 4 according to an embodiment of the present disclosure.
Figure 10:
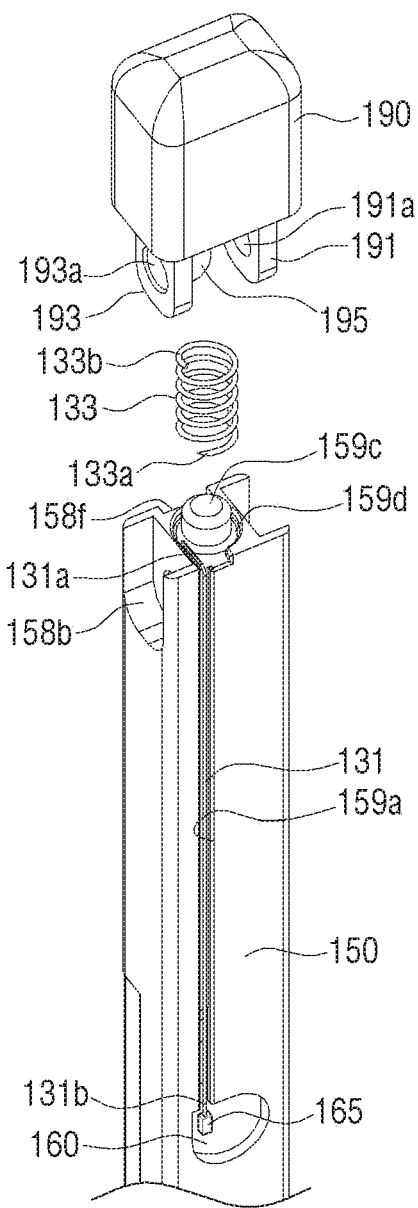
Figure 11:
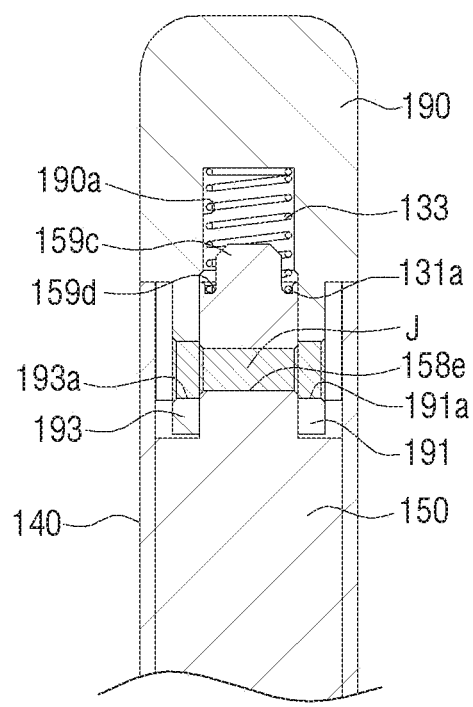
Figure 12:
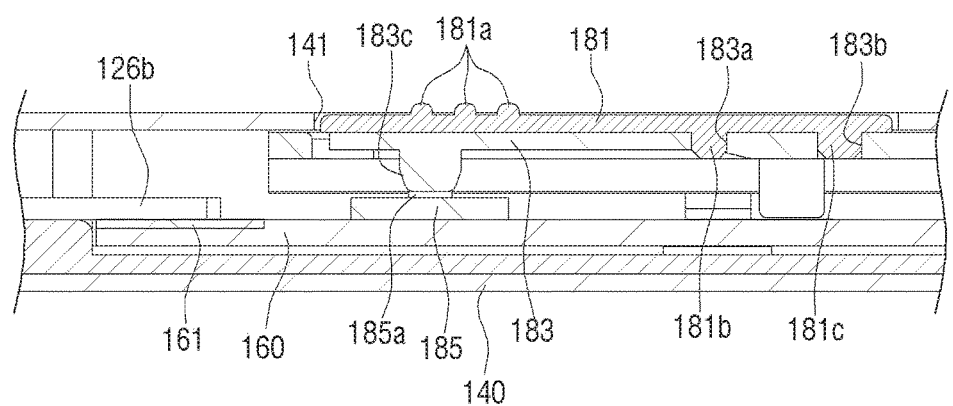
FIG. 12 is a cross-sectional diagram illustrating a section "B" illustrated in FIG. 4 according to an embodiment of the present disclosure.

FIGS. 4 and 5 are a combined perspective view and an exploded perspective view illustrating an input device according to an embodiment of the present disclosure, FIG. 6 is a schematic perspective view illustrating a printed circuit board (PCB) and a writing pressure module coupled thereto according to an embodiment of the present disclosure, FIG. 7 is a cross-sectional diagram illustrating a section "A" illustrated in FIG. 4 according to an embodiment of the present disclosure, FIG. 8A is schematic cross-sectional diagrams illustrating a state that a shape of a variable electrode is deformed as the variable electrode is in tight contact with a dielectric with preset pressure according to an embodiment of the present disclosure, FIG. 8B is a schematic cross-sectional diagram illustrating a state that a variable electrode is spaced from a dielectric in releasing of pressure applied to a conductive tip according to an embodiment of the present disclosure, FIG. 9 is a diagram illustrating a section "B" illustrated in FIG. 4 according to an embodiment of the present disclosure, and FIGS. 10 to 12 are diagrams illustrating a ground structure of the input device illustrated in FIG. 4 according to an embodiment of the present disclosure.

Referring to FIGS. 4 and 5, the input device 100 may include an inner case 150 of which a writing pressure module P and a ground unit 130 are disposed in an inside and an outer case 140 into which the inner case 150 is inserted. A head unit 128 may be disposed in a front end portion 140*a* of the outer case 140, and a cap 190 may be disposed in a rear end portion 140*b* of the outer case 140.

Referring to FIGS. 5 and 6, the writing pressure module P may vary the capacitance of the resonance circuit according to the pressing degree of the electronic apparatus 200 in response to writing being performed by the user using the input device 100. The writing pressure module P may include a housing 121, a variable capacitor VC, a first elastic member 122*a*, a second elastic member 122*b*, a movable member 124, the head unit 128, and the conductive tip 110. The writing pressure module P may have a predetermined length in an assembled state, and may be electrically coupled to a PCB 160 through a first electrode 126 and a second electrode 127 of the writing pressure module P. It will be described that the variable capacitor VC includes a conductive variable electrode 123 (hereinafter, referred to as variable electrode), a dielectric 125, the first electrode 126, and the second electrode 127.

Hereinafter, the configuration of the writing pressure module P will be described.

The housing 121 may be fixedly inserted into a receiving space 153 formed in a front end portion F of the inner case 150. The variable capacitor VC and the movable member 124 may be coupled to the inner side of the housing 121. The second electrode 127 which is one of components constituting the variable capacitor VC may be disposed in the outside of the housing 121. The variable capacitor VC may be fixed to the housing 121, and the movable member 124 may be coupled to the housing 121 to be slidable by a preset distance along a longitudinal direction of the housing 121. A portion of the movable member 124 may protrude from one end opening of the housing 121, and a portion of the first electrode 126 may protrude from the other end opening of the housing 121.

A pair of elongated holes 121*a*, to which a pair of coupling protrusions 124*a* formed in both sides of the movable member 124 are flowably coupled, may be formed in the housing 121. The pair of elongated holes 121*a* may be formed to a preset length along the longitudinal direction of the housing 121, and the pair of coupling protrusions 124*a* may be formed to have a shorter length than that of the pair of elongated holes 121*a*. A pair of fixing holes 121*b* may be formed in the housing 121, and a pair of fixing protrusions 126*a* formed on both sides of the first electrode 126 are fixedly coupled to the pair of fixing holes 121*b* so that the pair of fixing protrusions 126*a* are not flowable. Accordingly, the movable member 124 may be moved back and forth along the longitudinal direction of the housing 121 in a state that the movable member 124 is coupled to the housing 121.

Referring to FIG. 7, the movable member 124 may be formed of a synthetic resin having conductivity or a metal. The movable member 124 may be disposed in one side of the variable capacitor (see VC of FIG. 5) to electrically couple the conductive tip 110 to the parallel resonance circuit. The rear end 110*a* of the conductive tip 110 may be coupled to a coupling hole 124*d* which is formed in a front end portion 124*b* of the movable member 124, and the movable member 124 may be electrically coupled to a first connection portion 127*a* of the second electrode 127 through the first elastic member 122*a*. A front end portion 123*a* of the variable electrode 123 may be coupled to a coupling hole 124*e* which is formed in a rear end portion 124*c* of the movable member 124.

The movable member 124 may be disposed in the inside of the housing 121 to be slidable by a preset distance along the longitudinal direction of the housing 121. As described above, the pair of coupling protrusions 124*a* formed in one surface of the movable member 124 may be flowably coupled to the pair of elongated holes 121*a* formed in one side of the housing 121. Accordingly, the movable member 124 may be linearly moved back and forth by preset distance along the longitudinal direction of the housing in a state that the movable member 124 is coupled to the housing 121. The forward and backward moving distances of the movable member 124 may correspond to the pressing degree of the conductive tip 110 onto the surface of the electronic apparatus 200 and may correspond to a variation amount of the capacitance. For example, the contact area of the variable electrode 123 with the dielectric 125 may be increased in proportion to the backward moving distance of the movable member 124 to a side of the PCB 160. In this example, the facing area of the variable electrode 123 and the first electrode 126 may be increased and the capacitance may be increased. In another example, the contact area of the variable electrode 123 with the dielectric 125 may be reduced in proportion to the forward moving distance of the movable member 124 to a side of the head unit 128. In this example, the facing area of the variable electrode 123 and the first electrode 126 may be reduced and the capacitance may be reduced.

The first elastic member 122*a* may be formed of a conductive metal and may be disposed to surround the front end portion 124*b* of the movable member 124 so that the movable member 124 may be elastically supported. One end of the first elastic member 122*a* may be supported by a first locking protrusion 124*f* of the movable member 124 and the other end of the first elastic member 122*a* may be supported by the first connection portion 127*a* of the second electrode 127. Accordingly, the first elastic member 122*a* may electrically couple the movable member 124 and the first connection portion 127*a* of the second electrode 127.

One end of the second elastic member 122*b* may be supported by a second locking protrusion 124*g* of the movable member 124 and the other end of the second elastic member 122*b* may be supported by a protrusion 124*h* formed inside the housing 121. The second elastic member 122*b* may be disposed to surround the rear end portion 124*c* of the movable member 124. The second elastic member 122*b* may have elasticity greater than that of the first elastic member 122*a* and may elastically support the movable member 124 together with the first elastic member 122*a*.

The second elastic member 122*b* may not serve to electrically couple the movable member 124 to the second electrode 127 unlike the first elastic member 122*a*, and the second elastic member 122*b* may serve only to elastically support the movable member 124.

The second elastic member 122*b* may have elasticity greater than that of the first elastic member 122*a*. This is because the second elastic member 122*b* presses the movable member 124 toward the head unit 128 so that the variable electrode 123 is not in contact with the dielectric 125.

The variable capacitor VC may be physically coupled to the conductive tip 110 through the movable member 124 and the housing 121. Pressure may be applied to the variable capacitor VC according to the movement of the conductive tip 110 to the longitudinal direction. As described above, the variable capacitor VC may include the variable electrode 123, the dielectric 125, the first electrode 126, and the second electrode 127.

The variable electrode 123 may be formed substantially in a cylindrical shape and may be formed of an elastic member having conductivity. The front end portion 123*a* of the variable electrode 123 may be inserted into the coupling hole 124*e* formed in the rear end portion 124*c* of the movable member 124 and the other end portion 123*b* of the variable electrode 123 may be disposed to face the dielectric 125.

The other end portion 123*b* of the variable electrode 123 may be convexly formed toward the outer side thereof in a central portion rather than an edge portion. The other end portion 123*b* of the variable electrode 123 may be disposed at a preset interval from a first surface 125*a* of the dielectric 125.

The other end portion 123*b* of the variable electrode 123 may be in contact with the first surface 125*a* of the dielectric 125 in response to the pressure applied through the conductive tip 110 being received in the variable electrode 123 through the movable member 124.

Referring to FIG. 8A, in response to the pressure being continuously applied through the conductive tip 110, the pressure may be applied to the direction that the other end portion 123*b* of the variable electrode 123 presses the first surface 125*a* of the dielectric 125. Accordingly, the contact area between the other end portion 123*b* of the variable electrode 123 and the first surface 125*a* of the dielectric 125 may be increased.

Referring to FIG. 8B, in response to the pressure applied through the conductive tip 110 being reduced, the force which presses the first surface 125*a* of the dielectric 125 through the other end portion 123*b* of the variable electrode 123 may also be reduced, and the contact area between the other end portion 123*b* of the variable electrode 123 and the first surface 125*a* of the dielectric 125 may be reduced. In response to the pressure applied through the conductive tip 110 being completely released, the other end portion 123*b* of the variable electrode 123 may not press the first surface 125*a* of the dielectric 125 anymore, and the other end portion 123*b* of the variable electrode 123 and the first surface 125*a* of the dielectric 125 may be mutually spaced through elasticity of the second elastic member 122*b*.

In response to a mutual contact area S between the variable electrode 123 and the first electrode 126 being varied, the capacitance C may be varied based on the following Equation 1.

$$C = \varepsilon \frac{S}{d} \qquad \text{Equation 1}$$

Here, d is a distance between the variable electrode 123 and the first electrode 126, and ε is a dielectric constant of the dielectric 125.

The change range in the capacitance C may be changed according to the dielectric constant ε, a size, a thickness, and the like of the dielectric 125.

The dielectric 125 may be formed in a circular disc shape having a fixed thickness. The dielectric 125 may include the first surface 125*a* and a second surface 125*b* located in an opposite side of the first surface 125*a*. The dielectric 125 may have the preset dielectric constant. The dielectric 125 may be received in the housing 121 in such a manner that the first and second surfaces 125*a* and 125*b* may meet a right angle to the longitudinal direction of the housing 121. The first surface 125*a* of the dielectric 125 may be spaced to face the variable electrode 123, and the second surface 125*b* of the dielectric 125 may be in contact with the first electrode 126.

The dielectric 125 may be formed of a dielectric film or an insulator having a fixed dielectric constant (for example, a synthetic resin such as polycarbonate (PC) or polyacetal (POM)), but this is not limited.

Referring back to FIGS. 6 and 7, the first electrode 126 may be fixedly coupled to the inner side of the housing 121, and a first connection portion 126*b* may be extendedly formed in a protrusion shape in one side of the first electrode 126, and a second connection portion 126*c* may be formed in a surface shape in the other side of the first electrode 126. The first connection portion 126*b* of the first electrode 126 may be coupled to a second connection pad 161 of the PCB 160 through soldering. The second connection portion 126*c* of the first electrode 126 may be in contact with the second surface 125*b* of the dielectric 125 formed in a disc shape. The second connection portion 126*c* may be disposed to be spaced from the dielectric 125 at intervals. Since a distance between the variable electrode 123 and the second connection portion 126*c* of the first electrode 126 may be further increased, the distance may affect the capacitance generated in the variable capacitor VC.

Referring back to FIGS. 5 and 7, the movable member 124 may be in electric contact with the first connection portion 127*a* of the second electrode 127 through the first elastic member 122*a*. The second electrode 127 may be disposed in a state that the second electrode 127 is fixed to the receiving space 153 formed in the front end portion F of the inner case 150. Since the first connection portion 127*a* of the second electrode 127 is electrically coupled to the movable member 124 moved through the first elastic member 122a, the second electrode 127 may be fixed to the inner case 150 without interlock with the movement of the movable member 124. A through hole 127b which the front end portion 124b of the movable member 124 passes therethrough may be formed in the first connection portion 127a of the second electrode 127.

The second electrode 127 may include first to third stationary portions 127c, 127d, and 127f and a coupling portion 127e to be rigidly fixed to the receiving space 153. The first and second stationary portions 127c and 127d may be formed in a portion of the second electrode 127 close to the first connection portion 127a, and the third stationary portion 127f may be formed in a position of the second electrode 127 close to a second connection pad 163 of the PCB 160 through the coupling portion 127e. The coupling portion 127e may couple the second stationary portion 127d and the third stationary portion 127e.

The first to third stationary portions 127c, 127d, and 127f may be coupled to stationary grooves 155a, 155b, and 155c formed in both sidewalls 153a and 153b of the front end portion F of the inner case 150. The connection portion 127e may be disposed in an outer surface of any one 153a of the sidewalls 153a and 153b. A connection portion 127g may be extendedly formed in an end portion of the third stationary portions 127f. The connection portion 127g may be coupled to the second connection pad of the PCB 160 through soldering.

The head unit 128 may be coupled to the front end of the inner case 150. To this end, a pair of coupling protrusions 128a coupled to a pair of coupling grooves 154a formed in the front end of the inner case 150 may be formed in the rear end of the head unit 128. A guide member 129 for guiding the forward and backward movement of the conductive tip 110 may be inserted into the inside of the head unit 128. The guide member 120 passes a through hole 154 formed at a front end of the inner case 150.

Referring back to FIG. 6, the ground unit 130 may form electrical connection with the user through at least one of direct connect or capacitive coupling. The ground unit 130 may include a ground line 131 and an extension member 133.

Referring to FIGS. 9 and 10, the ground line 131 may have substantially a length which extends from the PCB 160 to the rear end of the inner case 150. One end 131a of the ground line 131 may be formed to be bent in the rear end of the inner case 150, and the other end 131b of the ground line 131 may be coupled to a ground pad 165 of the PCB 160 through soldering.

The one end 131a of the ground line 131 may be coupled to the cap 190 through the extension member 133 formed in a coil spring shape. The cap 190 may be coupled to the outer case 140 through a connection protrusion 195, and thus the ground unit 130 may electrically couple the ground pad 165 of the PCB 160 and the outer case 140. It has been described that the outer case 140 is entirely formed of a metallic material, but this is not limited thereto. For example, a portion of the outer case 140 close to the cap 190 may be formed of a conductive metal, and the remaining portion of the outer case 140 may be formed of a nonconductive material.

The ground line 131 may be inserted into a guide groove 159a formed in the inner case 150, and the one end 131a of the ground line 131 may be inserted into a portion of a receiving groove 159d in which the extension member 133 is placed. The one end 131a of the ground line 131 may be in contact with one end 133a of the extension member 133 in response to the extension member 133 being placed in the receiving groove 159d.

Referring to FIG. 11, the one end 133a of the extension member 133 may be coupled to a fixing protrusion 159c formed to protrude in the rear end of the inner case 150. The one end 133a of the extension member 133 may be in contact with the one end 131a of the ground line 131 and the other end 133b of the extension member 133 may be in contact with an inner groove 190a of the cap 190. The extension member 133 may be elastically disposed between the rear end of the inner case 150 and the inner groove 190a of the cap 190 to electrically couple the ground line 131 and the cap 190. The cap 190 formed of a conductive metal may be electrically coupled to the outer case 140 formed of a conductive metal. Accordingly, the ground pad 165 of the PCB 160 may be grounded to the outer case 140 through the ground unit 130 and the cap 190.

The extension member 133 of the ground unit 130 in the embodiment is formed in a coil spring shape, but this is not limited thereto. The extension member 133 may be formed in a straight form or a curved form. For example, the extension member 133 included in the ground unit 130 may be omitted, and the one end 131a of the ground line 131 may extend to the cap 190 so that the ground line 131 may be in direct contact with the cap 190. In an embodiment, the ground unit 130 may extend in a length or may be bent in a multistage so that the one end 131a of the ground line 131 may be in direct contact with the outer case 140.

Referring back to FIG. 5, a through hole 141 which a pressing part 181 included in the button unit 180 is exposed therethrough may be formed in one surface of the outer case 140. The pressing part 181 may be disposed in the position in which the user easily pushes the pressing part 181 through an index finger or a thumb in response to the input device 100 being griped by the user. The inner case 150 in which the PCB 150 and the writing pressure module P are installed may be disposed in the inside of the outer case 140 as illustrated in FIG. 5.

A mounting space 151 in which the PCB 160 is placed may be provided in a central portion M of the inner case 150, the receiving space 153 in which a portion of the writing pressure module P is disposed may be provided in the front end portion F of the inner case 150, and coupling grooves 158a and 158c to which portions of the cap 190 may be coupled may be formed in the rear end portion R of the inner case 150.

A plurality of snap coupling protrusions 152 may be provided in the inner case 150 so that the PCB 160 may not be separated from the central portion M of the inner case 150. The plurality of snap coupling protrusions 152 may be formed in inner surfaces of both sidewalls 151a and 151b of the central portion M of the inner case 150 at intervals. The plurality of snap coupling protrusions 152 may be smoothly snap-coupled to both sides of the PCB 160 in a process of pressing the PCB 160 to a side of the central portion M of the inner case 150 to place the PCB 160 in the central portion M of the inner case 150.

A plurality of stationary grooves 155a, 155b, and 155c for fixing the second electrode 127 to both sidewalls 153a and 153b of the front end portion F may be formed in the inner case 150. Both sidewalls 153a and 153b may form the receiving space 153 in which the writing pressure module P is disposed. A guide hole 127b, which communicates with the receiving space 153 and which a portion of the movable member 124 of the writing pressure module P passes therethrough and is inserted thereinto, may be formed in the front end portion F of the inner case 150. The guide hole 127*b* may have a shape corresponding to an outer circumference shape of the movable member 124. The shape of the guide hole 127*b* and the outer circumference shape of the movable member 124 may be formed in a non-circular shape so that the movable member 124 may not be rotated during moving forward and backward along the guide hole 127*b*.

Referring back to FIG. 10, a coupling groove 158*b* to which the cap 190 is coupled may be formed in both sides of the rear end of the inner case 150, and a fixing protrusion 159*c* to which the extension member 133 of the ground unit 130 is coupled may be formed to protrude in the rear end of the inner case 150.

Referring back to FIGS. 7 and 9, the first connection pad 161 and the second connection pad 163 to which the first electrode 126 and the second electrode 127 are coupled may be formed in one surface of the PCB 160, and the ground pad 165 for ground may be formed in an opposite surface of the PCB 160. The first and second connection pads 161 and 163 may be located close to the writing pressure module P, and the ground pad 165 may be located close to the cap 190.

Referring back to FIG. 5, a cover 170 may be formed to have substantially a length similar to a length of the PCB 160 and cover the PCB 160 placed in the central portion M of the inner case 150. A supporting part 183 constituting the operation button unit 180 may be formed in the cover 170.

Referring to FIG. 12, the operation button unit 180 may include the pressing part 181 of which a top is exposed through the through hole 141 of the outer case 140, the supporting part 183 disposed in the cover 170, and a switch 185 (for example, tactile switch) mounted on the PCB 160.

An anti-slip protrusion 181*a* may be formed in the top of the pressing part 181 of the operation button unit 180, and the anti-slip protrusion 181*a* may be disposed in a position of the top of the pressing part 181 substantially corresponding to a button 185*a* of the switch 185. Accordingly, the button 185*a* of the switch 185 may be pressed through the supporting part 183 in response to the anti-slip protrusion 181*a* being pressed by the user. A pair of insertion holes 183*a* and 183*b* to which a pair of fixing protrusions 181*b* and 181*c* formed in a bottom of the pressing part 181 are press-coupled may be formed in the supporting part 183. A pressing protrusion 183*c* for pressing the button 185*a* of the switch 185 may be formed in a bottom of the supporting part 183.

The switch 185 of the operation button unit 180 may selectively couple the second capacitor 120*d* to the parallel resonance circuit 120*b* and 120*c* in parallel according to an on/off command of the user. Accordingly, in response to the switch 185 being turned on by the user, the second capacitor 120*d* may be coupled to the parallel resonance circuit 120*b* and 120*c* in parallel and the resonance frequency in the resonance system may be varied. The variation range of the resonance frequency may be different from the variation range of the variable capacitor. For example, in response to the variation range of the resonance frequency according to the change of the capacitor being within 5 kHz, the variation range of the resonance frequency according to the operation of the switch 185 may exceed 5 kHz. Accordingly, the electronic apparatus 200 may detect whether the resonance frequency is changed according to the change of the variable capacitor or according to the on/off of the switch 185 through the variation range of the resonant frequency. The electronic apparatus 200 may be implemented to simultaneously detect the change in the resonance frequency of the variable capacitor and the change in the resonance frequency by the switch 185.

Figure 13:
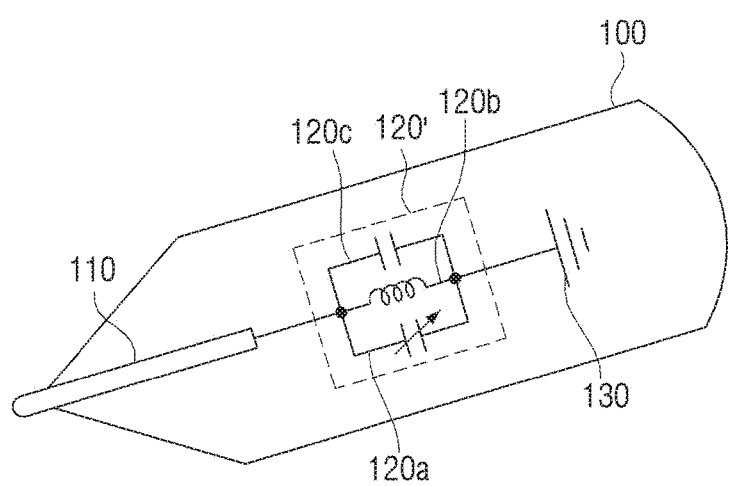
FIG. 13 is a schematic diagram illustrating another circuit example of the input device illustrated in FIG. 1 according to an embodiment of the present disclosure.

FIG. 13 is a schematic diagram illustrating another circuit example of the input device illustrated in FIG. 1 according to an embodiment of the present disclosure.

The example that the input device 100 includes the operation button unit 180 has been described in the embodiment of the present disclosure, but the operation button unit 180 may be omitted. Referring to FIG. 13, a resonance circuit 120' may include only a variable capacitor 120*a*, an inductor 120*b*, and a first capacitor 120*c*. The resonance circuit 120' may perform the same operation as the above-described resonance circuit 120 other than the function according to the on/off of the switch 185.

Referring back to FIGS. 10 and 11, the cap 190 may be coupled to the rear end of the inner case 150 through a connection pin J. The connection pin J may be simultaneously coupled to coupling holes 191*a* and 193*a* of coupling parts 191 and 193 and the coupling hole 158*e* in the rear end of the inner case 150. The cap 190 may be inserted into an insertion groove 158*f* formed in the rear end of the inner case 150. A connection protrusion 195 may be in contact with an inner surface of the outer case 140 and the cap 190 may be in electric contact with the outer case 140.

A configuration of an input device according to another embodiment will be described with reference to FIGS. 14 to 16.

Figure 14:
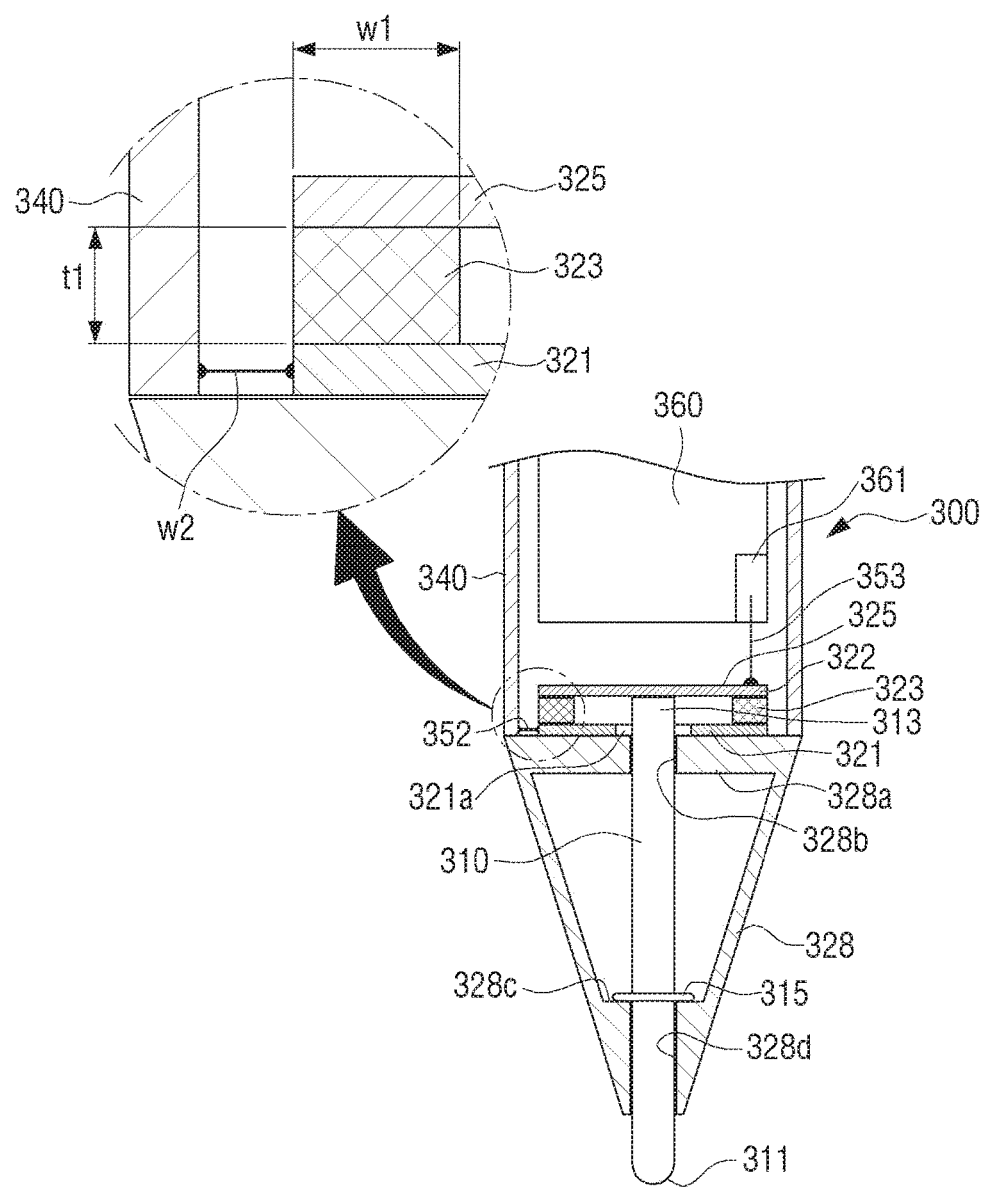
FIG. 14 is a cross-sectional diagram illustrating an input device according to another embodiment of the present disclosure.
Figure 15:
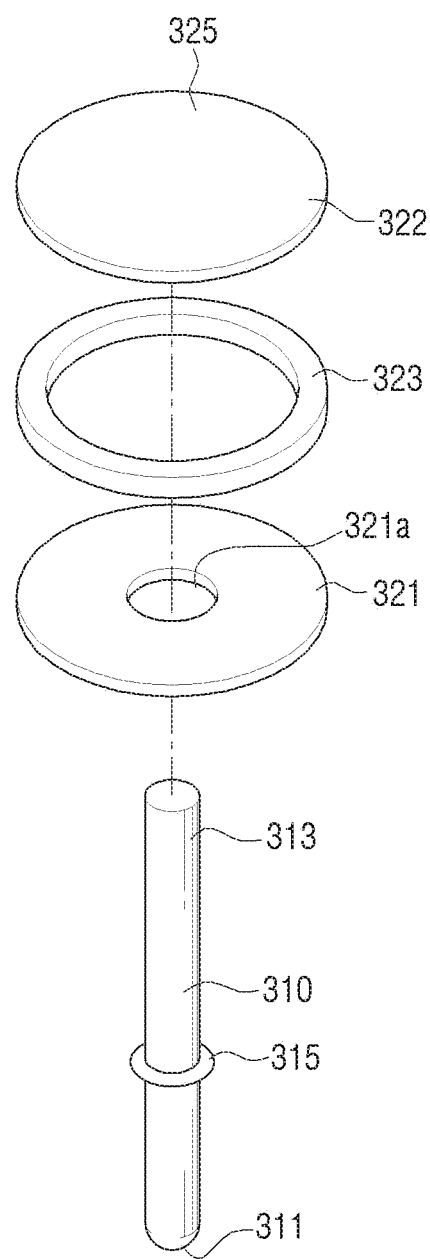
FIG. 15 is an exploded perspective view illustrating a variable capacitor illustrated in FIG. 14 according to an embodiment of the present disclosure.
Figure 16:
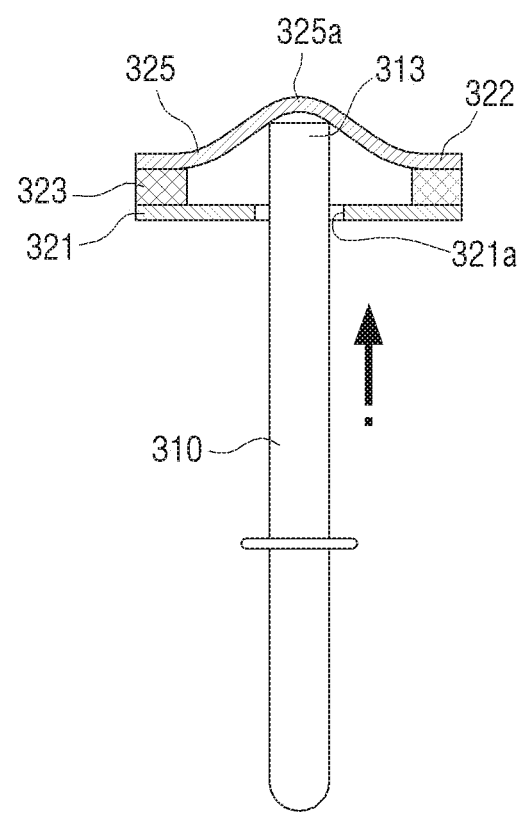
FIG. 16 is a cross-sectional diagram illustrating an operation state of a variable capacitor illustrated in FIG. 14 according to an embodiment of the present disclosure.

FIG. 14 is a cross-sectional diagram illustrating an input device according to another embodiment of the present disclosure, FIG. 15 is an exploded perspective view illustrating a variable capacitor illustrated in FIG. 14 according to an embodiment of the present disclosure, and FIG. 16 is a cross-sectional diagram illustrating an operation state of the variable capacitor illustrated in FIG. 14 according to an embodiment of the present disclosure.

Referring to FIGS. 14 and 15, an input device 300 according to another embodiment may have a simpler structure than that of the above-described input device 100. A variable capacitor may include a first electrode 321, a second electrode 322, a dielectric 323, and a variable electrode 325.

In the input device 300 according to another embodiment, the first electrode 321 and the second electrode 322 may be reversely installed to the positions of the first and second electrodes 126 and 127 of the input device 100, and the ground unit 130 for ground may be omitted. That is, in the input device 300, the first electrode 321 may be disposed in a side of a head unit 328, and the second electrode 322 may be disposed in a side of a PCB 360. The second electrode 322 may be integrally formed with the variable electrode 325 and may be a portion of the variable electrode fixed to the dielectric 323.

The first electrode 321 may be directly coupled to an inner side of an outer case 340 through a connection line 352. The second electrode 322 may be coupled to a connection pad 361 of the PCB 360 through a connection line 353. Since the portion of the variable electrode 325 fixed to the dielectric 323 is used as the second electrode 322, even in response to the variable electrode 325 being deformed by pressure applied to a conductive tip 310, the second electrode 322 is maintained in the fixed state, and thus degradation of durability may be prevented.

The first electrode 321 may have substantially a disc shape, and a through hole 321*a* which the conductive tip 310 pass therethrough may be formed in the center of the first electrode 321. The through hole 321*a* may have a larger inner diameter than an outer diameter of the conductive tip 310 so that the conductive tip 310 is not in contact with the first electrode 321. The first electrode 321 may be fixed to a first supporting portion 328a of the head unit 328 through an adhesive and the like.

The dielectric 323 may be disposed between the first electrode 321 and the variable electrode 325 and may be formed substantially in a ring shape having a fixed thickness t1 and a fixed width w1. The dielectric 323 may be formed of an insulator. The dielectric 323 may be fixed to a top surface of the first electrode 323 through an adhesive and the like.

Referring to FIG. 16, the variable electrode 325 may be formed substantially in a disc shape and may be formed to have an outer diameter similar to that of the first electrode 321. The variable electrode 325 may be formed of a flexible material having conductivity. In response to the conductive tip 310 being pressed to move a side of the variable electrode 325 in using of the input device 300, a central portion 325a of the variable electrode 325 may be pressed by a top end 313 of the conductive top 310 and convexly protrude to a pressing direction of the conductive tip 310. Accordingly, a distance between the first electrode 321 and the variable electrode 325 may be increased and the capacitance may be reduced. In response to the capacitance being reduced, the resonance frequency may be increased, and the electronic apparatus 200 may calculate the degree of writing pressure by detecting an increased variation value of the resonance frequency.

In the variable capacitor applied to the input device 300 according to another embodiment, the capacitance C may be changed according to change in the distance d between the first electrode 321 and the variable electrode 325 as in Equation 1. In the variable capacitor of the input device 100 according to an embodiment, the capacitance C may be changed according to the change in the contact area S between the first electrode 126 and the variable electrode 123.

Referring back to FIG. 14, the conductive tip 310 may be slidably inserted into a first through hole 3287b formed in the first supporting portion 238a of the head unit 328 and a through hole 328d formed in a second supporting part 328c of the head unit 328. As a locking protrusion 315, which is locked to the second supporting portion 328c formed in the inner side of the head unit 328, is formed to protrude in the outer circumference of the conductive tip 310, the locking protrusion 315 may prevent the conductive tip 310 from being released from the head unit 328. A separate insulating member (see 111 of FIG. 5) is not coupled to a front end 311 of the conductive tip 310, but this is not limited thereto. An insulating member may be coupled to the front end 311.

A configuration of an input device according to another embodiment will be described with reference to FIGS. 17 and 18.

Figure 17:
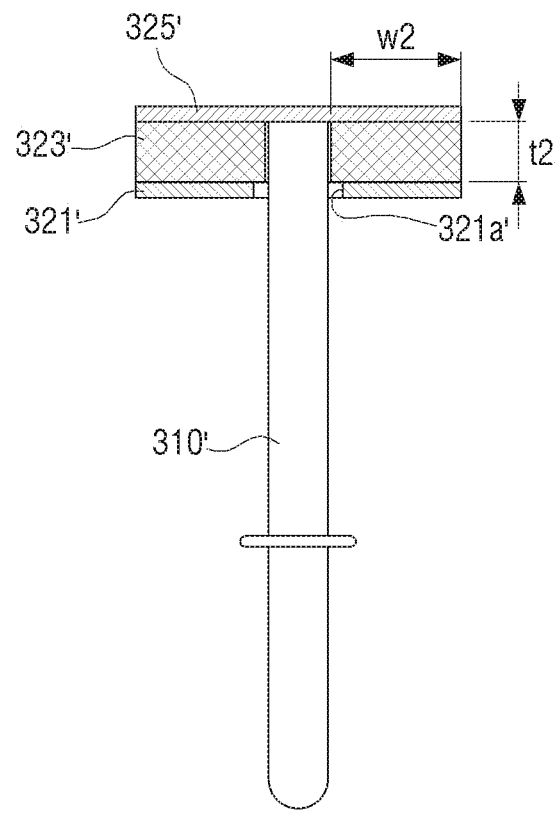
FIG. 17 is a cross-sectional diagram illustrating an input device according to another embodiment according to an embodiment of the present disclosure.
Figure 18:
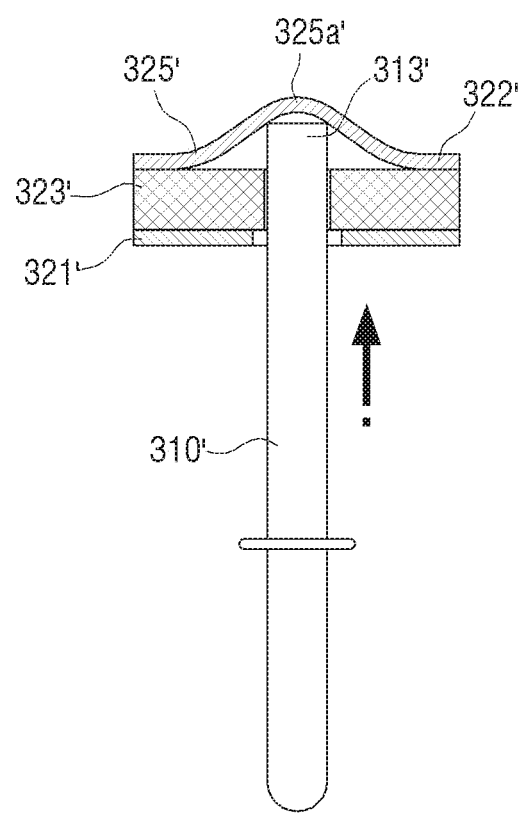
FIG. 18 is a cross-sectional diagram illustrating an operation state of a variable capacitor illustrated in FIG. 17 according to an embodiment of the present disclosure.

FIG. 17 is a cross-sectional diagram illustrating an input device according to another embodiment of the present disclosure and FIG. 18 is a cross-sectional diagram illustrating an operation state of a variable capacitor illustrated in FIG. 17 according to an embodiment of the present disclosure.

The input device according to another embodiment may have the same configuration as that of the input device 300 described in FIGS. 14 to 16, but a shape of a dielectric 323' in the input device is different that of the dielectric 323 in the input device 300. Accordingly, only the configuration of the dielectric 323' in the input device according to another embodiment which is different from that of the input device 300 will be described.

Referring to FIG. 17, the dielectric 323' may have substantially a ring shape and may have a thickness t2 and a width w2 larger than the thickness t1 and the width w1 of the dielectric 323. Accordingly, the dielectric 323' may have a different dielectric constant from the dielectric 323, and the change range of the capacitance C may be different from that in the dielectric 323.

Referring to FIG. 18, the variable electrode 325' may be formed of a flexible material having conductivity and elasticity. Accordingly, in response to the conductive tip 310' being pressed to move a side of the variable electrode 325' in using of the input device, a central portion 325a' of the variable electrode 325' may be pressed by a top end 313' of the conductive top 310' and convexly protrude to a pressing direction of the conductive tip 310'. Accordingly, a distance between the first electrode 321' and the variable electrode 325' may be increased and the capacitance may be reduced. In response to the capacitance being reduced, the resonance frequency may be increased, and the electronic apparatus 200 may calculate the degree of writing pressure by detecting an increased variation value of the resonance frequency. In FIG. 17, the reference numeral 321a' which has not been described represents a through hole through which a conductive tip 310 passes, and the reference numeral 322' in FIG. 18 represents a second electrode 322 which forms a part of the variable electrode 325'.

Figure 19:
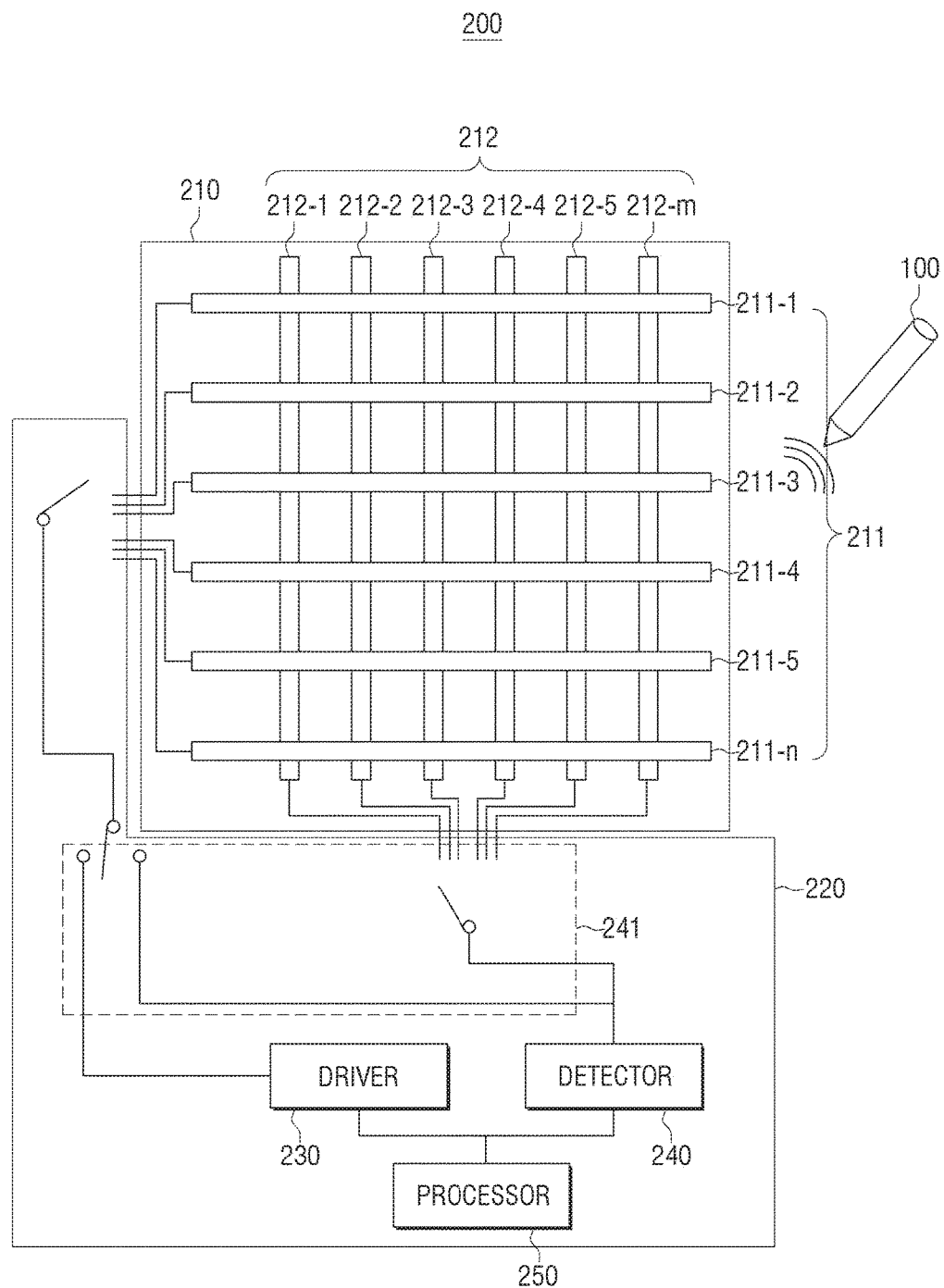
FIG. 19 is a detailed block diagram illustrating a configuration of the electronic apparatus illustrated in FIG. 1 according to an embodiment of the present disclosure.

FIG. 19 is a detailed block diagram illustrating a configuration of the electronic apparatus illustrated in FIG. 1 according to an embodiment of the present disclosure.

Referring to FIG. 19, the electronic apparatus 200 may include an electrode unit 210 and a panel controller 220.

The electrode unit 210 may include a plurality of electrode groups 211 and 212. For example, the electrode unit 210 may include a first electrode group 211 and a second electrode group 212 mutually arranged to different directions.

The first electrode group 211 may include a plurality of first electrodes 211-1, 211-2, 211-3, 211-4, and 211-5 to 211-$n$ arranged in parallel to a first direction (a horizontal direction). The plurality of first electrodes 211-1 to 211-$n$ may be implemented with a transparent electrode such as indium tin oxide (ITO). The plurality of first electrodes 211-1 to 211-$n$ may be used as an electrode for transmission which outputs an electric field transmission signal (hereinafter, referred to as transmission signal) for detecting a position of the input device 100.

The second electrode group 212 may include a plurality of second electrodes 212-1, 212-2, 212-3, 212-4, and 212-5 to 212-$m$ arranged in parallel to a second direction (a vertical direction). The plurality of second electrodes 212-1 to 212-$m$ may also be implemented with a transparent electrode like the first electrodes. The plurality of second electrodes 212-1 to 212-$m$ may be used as an electrode for reception which receives an electric field response signal (hereinafter, referred to as response signal) output from the input device 100.

The example that the electrodes of the first and second electrode groups 211 and 212 have a simple rectangular shape has been illustrated, but the electrodes may be implemented to have a more complex form. For example, the first electrode may have the same area and shape as those of the second electrode and the number of first electrodes may be equal to the number of second electrodes. In another example, according to the type of the electronic apparatus 200, the first electrode may have different area and shape from those of the second electrode and the number of first electrodes may be different from the number of second electrodes.

The panel controller 220 may perform transmission signal output and response signal reception using the first electrode group 211 and the second electrode group 212. Hereinafter, for clarity, a transmission signal output period may refer to a transmission period, and a response signal reception period may refer to a reception period. The transmission period and the reception period may be alternatively repeated. In response to the electronic apparatus 200 and the electrode unit being formed in an integrated form, a display period may be added between the transmission period and the reception period or before and after the transmission period and the reception period.

The panel controller 220 may include a driver 230, a detector 240, a switch unit 241, and a processor 250.

The driver 230 may apply a driving signal to the electrode unit during the transmission period. The driving signal may be a sine wave signal having a predetermined resonance frequency. For example, the driver 230 may simultaneously or sequentially apply electrical signals to the plurality of first electrodes 211-1 to 211-n during the transmission period. In another example, the driver 230 may sequentially apply electrical signals to the plurality of first electrodes in a predetermined number unit of first electrodes (for example, in units of 2 to 5 electrodes). In this example, the predetermined number of electrodes may be electrodes continuously arranged or electrodes distributedly arranged according to a fixed pattern.

The detector 240 may receive response signals from the electrodes in the electrode unit during the reception period. The response signal reception method may be accomplished through various patterns.

In an implementation example, the detector 140 may receive the response signals using both the first electrode group 211 and the second electrode group 212. In another implementation example, the detector 240 may receive the response signals only using the second electrode group 212 which are not used in transmission. For example, the detector 240 may sequentially receive the response signals in electrode units or in units of preset plural electrodes. In another example, the detector 240 may simultaneously receive the response signals through all the electrodes.

The detector 240 may perform various signal processing on the received response signals. For example, the detector 240 may amplify the response signals using an amplifier. In another example, the detector 240 may perform signal processing for differential amplification in units of two response signals. The detector 240 may perform signal processing for extracting only information within a preset frequency domain of the received response signal.

In various embodiments, the operations of the driver 230, the detector 240, and the switch unit 241 may be controlled through the processor 250 or through a microcontroller (not shown) separately provided in the panel controller 220. It will be described in the embodiment that the operations of the driver 230, the detector 240, and the switch unit 241 are controlled through the processor 250.

The processor 250 may control the driver 230, the detector 240, and the switch unit 241 to alternatively perform application of the driving signal and reception of the response signal for each electrode.

For example, the processor 250 may control the driver 230 to simultaneously apply the same driving signal to the plurality of first electrodes 211-1 to 211-n in a first time period. The processor 250 may control the detector 240 to detect a response signal through at least one electrode (for example, 211-1) in a second time period. The processor 250 may control the driver 230 to apply the same driving signal to the plurality of first electrodes 211-1 to 211-n again in a third time period. The processor 250 may control the detector 240 to receive a response signal from another electrode (for example, 211-2) in a fourth time period. The processor 250 may repeatedly perform the above-described process by the number of total electrodes. For example, in response to the numbers of first and second electrodes being six, the processor 250 may repeatedly perform the application/reception operation total 12 times.

In response to response signals being received from the plurality of electrodes, the processor 250 may determine an input point of the input device 100 based on a ratio between response signals received from the first electrodes 211-1, 211-2, 211-3, 211-4, 211-5, and 211-6 and a ratio between response signals received from the second electrodes 212-1, 212-2, 212-3, 212-4, 212-5, and 212-6.

For example, in response to a magnitude of the response signal of one first electrode 211-3 being larger than those of the response signals of other first electrodes 211-1, 211-2, 212-4, 211-5, and 211-6 and a magnitude of the response signal of one second electrode 212-2 being larger than those of the response signals of other second electrodes 212-1, 212-3, 212-4, 212-5, and 212-6, the processor 250 may determine a crossing position of the first electrode 211-3 and the second electrode 212-2 as the input point of the input device 100.

The example that the driving signals are simultaneously applied to all the first electrodes during the transmission period has been described, but the driving signals may be sequentially applied in electrode units or in units of plural first electrodes as described above.

In response to the input device 100 being not accurately located on one electrode but located between two electrodes, the processor 250 may determine the position of the input device 100 using an interpolation method based on a ratio between the largest response signal and a response signal received in an electrode close to an electrode which receives the largest response signal. In response to the interpolation method being used, resolution which can identify the input point of the input device 100 may be improved.

The switch unit 241 may selectively couple the plurality of electrodes to the driver 230, or may selectively couple the plurality of electrodes to the detector 240. For example, the switch unit 241 may couple an electrode to which the driving signal is to be applied and the driver 230 according to control of the processor 250. In this example, the switch unit 241 may allow an electrode to which the driving signal is not applied to be grounded or to be floating. In another example, the switch unit 241 may allow at least one electrode among the plurality of first electrodes and the plurality of second electrodes to be grounded in the reception period.

It has been described that the switch unit 241 is controlled through the processor 250, but the electronic apparatus may be implemented in such a manner that the driver 230 may control the switch unit 241 during application of the driving signal and the detector 240 may control the switch unit 241 during reception of the response signal. In response to a separate controller being provided in the panel controller 220 as described above, the switch unit 241 may be controlled through the controller.

It has been described in FIG. 19 that the plurality of electrodes are arranged in a matrix form, but the electronic apparatus may be implemented in such a manner that the plurality of electrodes are arranged in other forms other than the matrix form. It has been described in FIG. 19 that only one driver and one detector are provided, but the electronic apparatus may be implemented to include a plurality of drivers and a plurality of detectors. As described above, the electronic apparatus 200 may determine the input point of the input device 100 using the electrode unit 210.

The various embodiments are separately described, but the embodiments may not be inevitably solely implemented, and the configuration and operation of any one of the embodiments may be implemented to be combined with at least one of other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An input device which inputs a position to an electronic apparatus which receives a touch signal, the input device comprising:
   a conductive tip configured to receive an electric field transmission signal generated by at least one electrode of the electronic apparatus;
   a resonance circuit configured to generate an electric field response signal based on the electric field transmission signal;
   a variable capacitor configured to vary the electric field response signal based on pressure applied to the conductive tip;
   a case in which the resonance circuit and the variable capacitor are disposed; and
   a conductive movable member which is slidably disposed in the case and coupled at one end to the conductive tip,
   wherein the variable capacitor includes a first electrode and a second electrode coupled to the resonance circuit, a conductive variable electrode disposed to face the first electrode, and a dielectric disposed between the first electrode and the conductive variable electrode,
   wherein the second electrode is disposed in a side of the conductive movable member and fixed to the case, and
   wherein the variable electrode is coupled to another end of the conductive movable member, and the one end of the conductive moveable member is coupled to the second electrode through an elastic member.

2. The input device of claim 1, wherein a contact area of the conductive variable electrode with the dielectric varies based on the pressure.

3. The input device of claim 2, wherein a portion of the conductive variable electrode which is in contact with the dielectric protrudes in a convex shape.

4. The input device of claim 1, wherein the conductive movable member is elastically disposed in the case through another elastic member and is displaced by the pressure applied to the conductive tip.

5. The input device of claim 1, further comprising a ground unit coupled to the case to ground the resonance circuit,
   wherein the case includes an inner case and an outer case into which the inner case is inserted and is formed of a conductive metal, and
   wherein the ground unit includes a ground line disposed along the inner case and an extension member coupled to the ground line.

6. The input device of claim 5, further comprising a cap formed of a conductive metal and coupled to the outer case, wherein the extension member is coupled to the cap.

7. The input device of claim 6, wherein the extension member is formed in a coil spring shape.

8. The input device of claim 1, wherein a distance of the conductive variable electrode to the first electrode is varied.

9. The input device of claim 8, wherein the conductive variable electrode is formed of a conductive material that is flexible.

10. The input device of claim 9, wherein the conductive variable electrode has a disc shape.

11. The input device of claim 9, wherein the distance of the conductive variable electrode to the first electrode is increased according to deformation in a shape of the conductive variable electrode by the conductive tip in response to the pressure applied to the conductive tip.

12. The input device of claim 11, wherein the conductive tip is disposed to pass through the first electrode and the dielectric and press a central portion of the conductive variable electrode.

13. The input device of claim 12, wherein the dielectric is fixedly disposed between the first electrode and the conductive variable electrode.

14. The input device of claim 13, wherein the first electrode is coupled to the case through a connection line.

15. The input device of claim 14, wherein the second electrode is a portion of the conductive variable electrode fixed to the dielectric.

16. The input device of claim 15, wherein the second electrode is coupled to the resonance circuit through the connection line.

17. The input device of claim 12, wherein the dielectric has a ring shape.

18. An electronic apparatus comprising:
   a touch panel configured to measure an input position of an input device, the touch panel including:
      at least one electrode; and
      a controller configured to:
         control an electric field transmission signal generated from the at least one electrode to be transmitted to the input device, and
         control an electric field response signal of the input device with respect to the electric field transmission signal to be received,
   wherein the input device includes:
      a conductive tip configured to receive the electric field transmission signal generated by the at least one electrode of the electronic apparatus;
      a resonance circuit configured to generate the electric field response signal based on the electric field transmission signal;
      a variable capacitor configured to vary the electric field response signal based on pressure applied to the conductive tip;
      a case in which the resonance circuit and the variable capacitor are disposed; and
      a conductive movable member which is slidably disposed in the case and coupled at one end to the conductive tip,
   wherein the variable capacitor includes a first electrode and a second electrode coupled to the resonance circuit, a conductive variable electrode disposed to face the first electrode, and a dielectric disposed between the first electrode and the conductive variable electrode,
   wherein the second electrode is disposed in a side of the conductive movable member and fixed to the case, and
   wherein the variable electrode is coupled to another end of the conductive movable member, and the conductive moveable member is coupled to the one end of the second electrode through an elastic member.

* * * * *